United States Patent [19]

Hasegawa et al.

[11] 4,345,771

[45] Aug. 24, 1982

[54] SEALING CUP FOR HYDRAULIC PISTON-CYLINDER DEVICE

[75] Inventors: Junzo Hasegawa, Obu; Masatoshi Yamada, Nagoya; Kaoru Nakamura, Anjo; Eiichi Yasuda, Nagoya, all of Japan

[73] Assignees: Aisin Seiki Kabushiki Kaisha, Kariya; Kabushiki Kaisha Toyota Chuo Kenkyusho, Nagoya; Toyota Jidosha Kogyo Kabushiki Kaisha, Toyota, all of Japan

[21] Appl. No.: 213,454

[22] Filed: Dec. 5, 1980

Related U.S. Application Data

[63] Continuation of Ser. No. 924,836, Jul. 14, 1978, abandoned.

[30] Foreign Application Priority Data

Jul. 15, 1977 [JP] Japan .................................. 52-85385

[51] Int. Cl.$^3$ .............................................. F16J 15/32
[52] U.S. Cl. .................................................. 277/205
[58] Field of Search ........................................ 277/205

[56] References Cited

U.S. PATENT DOCUMENTS

| | | | |
|---|---|---|---|
| 2,664,952 | 1/1954 | Losey | 277/205 |
| 2,686,402 | 8/1954 | Samuel | 74/18.2 X |
| 2,720,924 | 10/1955 | Brown | 277/205 X |
| 2,815,995 | 12/1957 | Young | 277/205 |
| 2,867,457 | 1/1959 | Riejing et al. | 277/205 X |
| 2,884,291 | 4/1959 | Whitten | 277/205 |
| 3,527,507 | 9/1970 | Clark | 277/205 X |
| 3,653,670 | 4/1972 | Sifri et al. | 277/205 X |
| 3,929,341 | 12/1975 | Clark . | |

FOREIGN PATENT DOCUMENTS

| | | | |
|---|---|---|---|
| 529112 | 8/1956 | Canada | 277/205 |
| 2002082 | 1/1970 | Fed. Rep. of Germany | 277/205 |
| 173682 | 10/1958 | France | 277/205 |
| 4516482 | 3/1965 | Japan | 277/205 |
| 50-168241 | 6/1975 | Japan . | |
| 1019523 | 2/1966 | United Kingdom | 277/205 |
| 1214986 | 9/1970 | United Kingdom | 277/205 |

*Primary Examiner*—Robert I. Smith
*Attorney, Agent, or Firm*—Finnegan, Henderson, Farabow

[57] ABSTRACT

In a sealing or piston cup for maintaining lubricating oil on a sealing surface, the sealing surface thereof is formed with a circumferentially extending angular recess or groove which functions to retain lubricating oil. The sealing cup with the recess can ensure a smooth and stable operation of the device.

8 Claims, 20 Drawing Figures

SEALING CUP FOR HYDRAULIC PISTON-CYLINDER DEVICE

This is a continuation of application Ser. No. 924,836 filed July 14, 1978, and now abandoned.

The invention relates to sealing means for piston-cylinder devices and more particularly to a sealing cup member for hydraulic piston-cylinder devices for automobile use.

Conventionally, automobiles are equipped with various types of hydraulic devices for actuating, for example, brakes and clutches. Such devices include piston-cylinder assemblies having pistons slidably movable in a cylinder bore. In order to provide a liquid-tight seal between the piston and the cylinder, an annular sealing member is used which is generally referred to as a piston cup or a sealing cup.

In general, such a piston cup comprises an annular base, an inner seal lip extending from the annular base and having an inner sealing surface adapted to be engaged with the piston, and an outer sealing lip extending from the annular base and having an outer sealing surface adapted to be engaged with the inner wall surface of the cylinder bore. In one of typical arrangements, the piston cup is mounted on the piston and is slidably moved along the wall surface of the cylinder bore, however, in another arrangement, the piston cup may be mounted on the cylinder and the piston is moved with respect to the piston cup.

In so-called SAE type piston cups, the inner sealing surface on the inner sealing lip is of a frusto conical shape which is inclined radially inwardly from the base so that the lip is radially outwardly expanded upon engagement with the piston. Similarly, the outer sealing surface on the outer sealing lip is of a frustoconical shape which is inclined radially outwardly from the base whereby the lip is deformed radially inwardly upon engagement with the cylinder bore wall. In so-called OPEL type piston cups, the outer sealing surface on the outer sealing lip is defined in an area adjacent to the free end of the lip.

These known types of the piston cups have been recognized as providing a satisfactory sealing effect. However, problems have been experienced in operation of the brakes and clutches, for example, in that a film of oil can not always be maintained on the surface on which the piston cup slidably moves with movement of the piston and there is often produced a substantial drag against the slidable movement thereof due to scrape of the cup. Thus, it is often required to apply a greater force for actuating the piston-cylinder devices. Further, there is sometimes produced a rough movement similar to a stick-slip movement so that it becomes difficult to ensure a stable operation of the devices.

It is therefore an object of the present invention to provide a sealing cup for a hydraulic piston-cylinder device which can ensure a smooth and stable operation of the devices.

Another object of the present invention is to provide a sealing cup for a hydraulic piston-cylinder device which can maintain lubricating oil on a sliding surface.

According to the present invention, the above and other objects can be accomplished by a sealing cup for a hydraulic piston-cylinder device which comprises an annular body of a resilient material including an annular base, an inner sealing lip extending from the annular base and having an inner sealing surface adapted to be engaged with a wall to be sealed, and an outer sealing lip extending from the annular base so as to encircle the inner sealing lip in spaced relation therewith and having an outer sealing surface adapted to be engaged with a wall surface to be sealed, at least one of said inner and outer sealing surfaces being slidably movable with respect to corresponding one of said piston and cylinder walls, said one sealing surface being formed with a circumferentially extending recess or groove for retaining lubricating oil therein. In accordance with the present invention, an annular groove in the sealing surface serves to maintain a slight gap with respect to the co-operating surface or at least provide an area of smaller contact pressure when the sealing surface is brought into contact with the co-operating wall surface under pressure or by elasticity of the sealing cup, so that a small amount of oil is always retained between the sealing surface and the co-operating surface to provide an adequate lubrication. In order to ensure provision of the slight gap between the sealing surface and the co-operating wall surface, the angular groove or recess on the sealing surface is formed by at least two straight lines which are intersected at a certain angle and the maximum depth of the groove is positioned adjacent to a part where the maximum seal pressure may be produced.

According to an additional feature of the present invention, said one sealing surface has a tip end portion which has a tip edge and is inclined with respect to an axis of the cylinder by an angle between 1° and 15° radially toward the tip edge of the sealing surface. Preferably, the angle of inclination of the tip end portion is 1° to 7° radially as seen in the direction toward the tip edge of the sealing surface. The angle of the leading edge of the sealing cup is defined as inclination toward a wall where the sealing cup is slidably contacted. With this arrangement, the tip end portion defines a wedge shaped gap with respect to the co-operating surface for retaining lubricating oil so that the drag force can further be decreased due to the wedge effect.

The above and other objects and features of the present invention will become apparent from the following descriptions of preferred embodiments with reference to the accompanying drawings, in which;

FIGS. 18 (A) and (B) show modification of the piston cup according to the present invention.

Figure 1:
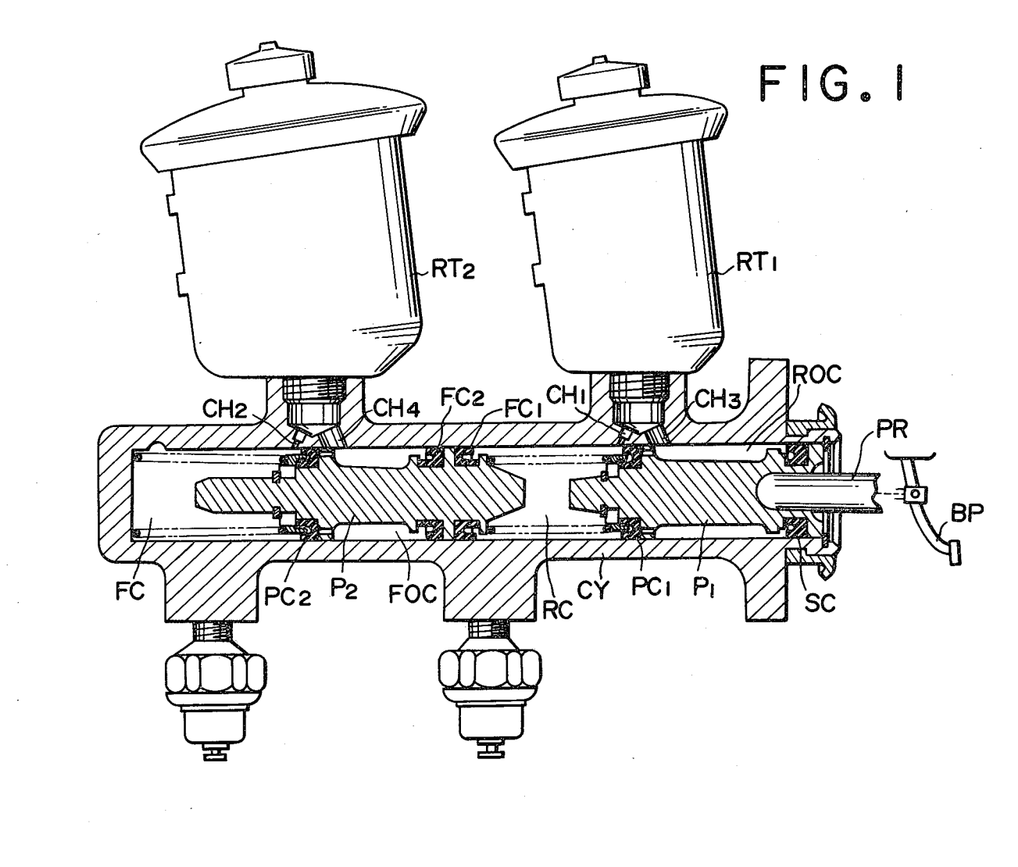
FIG. 1 is a sectional view of a brake master cylinder in which piston cups in accordance with the present invention can be employed.

Referring now to the drawings, particularly to FIG. 1, there is shown a brake master cylinder device which comprises a cylinder CY having a longitudinally or axially extending cylinder bore, and a first piston $P_1$ and a second piston $P_2$ both received in the cylinder bore for axial slidable movement. The first piston $P_1$ is connected with an actuating push rod PR which is in turn connected with a brake actuating member such as a brake pedal BP so that the first piston $P_1$ is axially displaced through an actuation of the brake pedal BP.

Between the first and second pistons $P_1$ and $P_2$, there is defined a rear pressure chamber RC, while a front pressure chamber FC is defined between the second piston $P_2$ and the closed end of the cylinder bore opposite to push rod PR. The first piston $P_1$ is formed at its intermediate portion with a circumferential recess to define a rear oil chamber ROC. Similarly, the second piston $P_2$ is formed at its intermediate portion with a circumferential recess to define a front oil chamber FOC.

On the cylinder CY, there are mounted a first oil reservoir $RT_1$ and second oil reservoir $RT_2$. The first oil reservoir $RT_1$ is connected through a passage $CH_1$ with the rear pressure chamber RC and through a passage $CH_3$ with rear oil chamber ROC. The second oil reservoir $RT_2$ is connected respectively through passage $CH_2$ and $CH_4$ with the front pressure chamber FC and the front oil chamber FOC. The rear and front pressure chambers RC and FC are connected respectively through suitable conduits with rear and front wheel cylinders (not shown).

The first piston $P_1$ has a primary sealing cup $PC_1$ and a secondary sealing cup SC. The primary sealing cup $PC_1$ is mounted on the first piston $P_1$ at the end adjacent to the rear pressure chamber RC while the secondary sealing cup SC is mounted at the opposite end. The second piston $P_2$ has a pair of floating sealing cups $FC_1$ and $FC_2$ and a primary sealing cup $PC_2$. The primary sealing cup $PC_2$ is mounted on the second piston $P_2$ at an end adjacent to the front pressure chamber FC, while the floating cups $FC_1$ and $FC_2$ are mounted at the opposite end.

As the brake pedal BP is actuated, the first piston $P_1$ is axially displaced through the push rod PR to such a position that the passage $CH_1$ is closed by the primary sealing cup $PC_1$. Thus, a hydraulic pressure is produced in the rear pressure chamber RC and the second piston $P_2$ is then axially displaced under the pressure in the rear pressure chamber RC to produce a pressure in the front pressure chamber FC. The pressure in the chambers RC and FC is transmitted to the rear and front wheel cylinders to actuate the same.

It should be noted that the primary sealing cups $PC_1$ and $PC_2$ on the first and second pistons $P_1$ and $P_2$, respectively, function to seal the rear and front pressure chambers RC and FC. The secondary sealing cup SC on the first piston $P_1$ functions to seal the inside of the cylinder CY from the atmosphere. Further, the floating cups $FC_1$ and $FC_2$ function to separate the front oil chamber FOC from the rear pressure chamber RC.

Figure 2:
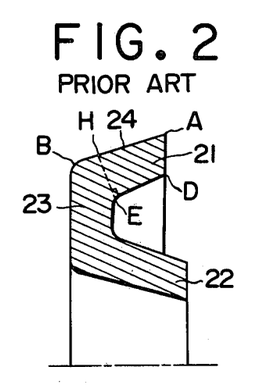
FIG. 2 is a fragmentary sectional view of a piston cup in accordance with a conventional design.

FIG. 2 shows a typical example of so-called conventional SAE type sealing cup which is suitable for use as a primary cup or a floating sealing cup which is subjected to a hydraulic pressure in operation. As shown in FIG. 2, the sealing cup comprises an annular body of a resilient material having a cross-section including a base 23, an outer sealing lip 21 and an inner sealing lip 22. The inner sealing lip 22 is inclined radially inwardly from the base 23 to provide a frustoconical configuration. The outer sealing lip 21 is inclined radially outwardly from the base to provide a frustoconical shape and has an outer sealing surface 24 which is adapted to be brought into engagement with the wall surface of the cylinder bore.

Figure 3:
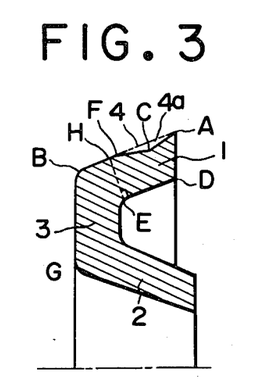
FIG. 3 is a sectional view similar to FIG. 2 but showing an embodiment of the present invention.

In FIG. 3, there is shown an embodiment of the present invention in which the feature of the present invention is incorporated in the conventional sealing cup as shown in FIG. 2. The sealing or piston cup comprises an annular body of a resilient material having a cross-section including a base 3, an outer diverging sealing lip 1 and an inner converging sealing lip 2. The outer sealing lip 1 has an outer sealing surface 4 on which a circumferentially extending recess or groove 4a is formed. The recess 4a as of a substantially V-shaped configuration with one of the top edges of the V-shape coincident with the free edge A of the sealing surface 4 wherein the pressure of contact with the inner wall of the cylinder bore is the greatest. The other of the top edges of the V-shape is located as shown by F at a point offset toward the edge A from a point H, which is defined as a point of intersection of the outer sealing surface 4 of the outer sealing lip 1 with a line perpendicular to the inner surface of the lip 1 passing through a point E of intersection between the inner surface of the lip 1 and the inner surface of the base 3. The recess 4a has a bottom C which is located between the points A and F.

the particular location of the recess 4a having a V-shaped cross section provides advantageous results. In use of this type of sealing cup, the outer sealing lip 1 is subjected to a hydraulic pressure which functions to force the sealing lip 1 radially outwardly. Even under such pressure, the V-shaped recess 4a provides an area of smaller contact pressure so that a film of hydraulic oil can always be maintained in the area to provide an adequate lubrication. It is therefore possible to prevent any increase in the drag force against the slidable movement of the piston and ensure a smooth piston operation.

Figure 6:
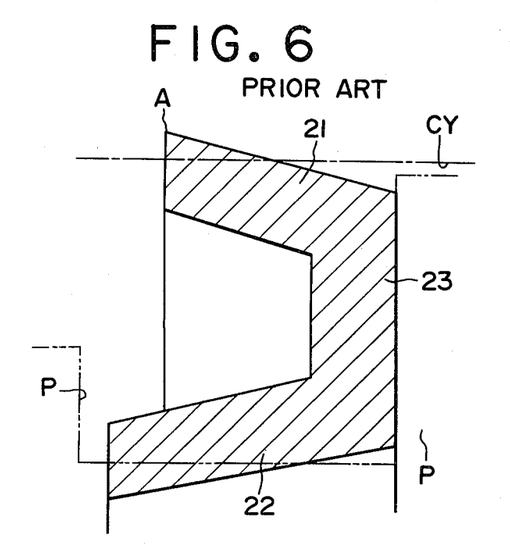
FIG. 6 is a diagrammatical illustration of a conventional piston cup in unmounted condition.
Figure 7:
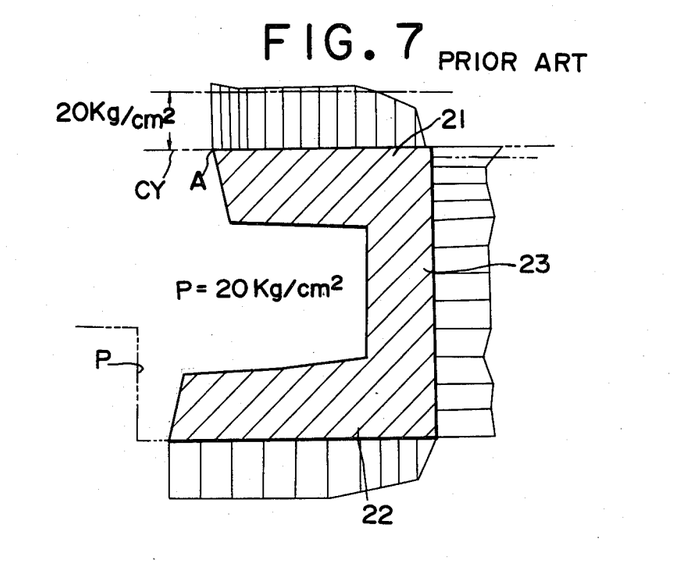
FIG. 7 is a diagrammatical illustration of the conventional piston cup shown in FIG. 6 in an operative condition and showing pressure distributions on the sealing lips.

In order to describe the features of the present invention in more detail, reference will now be made to FIGS. 6 through 9. Referring at first to FIGS. 6 and 7, there is shown a conventional SAE type sealing cup having a base 23, an outer sealing lip 21 and an inner sealing lip 22. The broken line CY designates a contour line of the cylinder wall, and the broken line P a contour line of the piston.

As shown in FIG. 6, the outer sealing lip 21 has an edge portion of which the outer diameter is larger than the diameter of the cylinder bore. Further, the inner sealing lip 22 has an edge portion of which the inner diameter is smaller than the diameter of the piston on which the sealing cup is mounted. Thus, when the sealing cup is mounted on the piston P and is fitted in the cylinder bore, the sealing lip portions 21 and 22 are radially deformed so that they are brought into contact under pressure with the piston P and the cylinder CY, respectively. In operation, the sealing cup is subjected to a hydraulic pressure which will be provided in the cylinder. FIG. 7 shows contact pressure distributions on the outer and inner sealing lips 21 and 22 when the sealing cup is subjected to the hydraulic pressure of 20 $Kg/cm^2$.

It will be noted In FIG. 7 that, in the conventional design, the outer sealing lip 21 is in engagement with the cylinder bore under a pressure greater than 20 $kg/cm^2$ throughout the length thereof.

Figure 8:
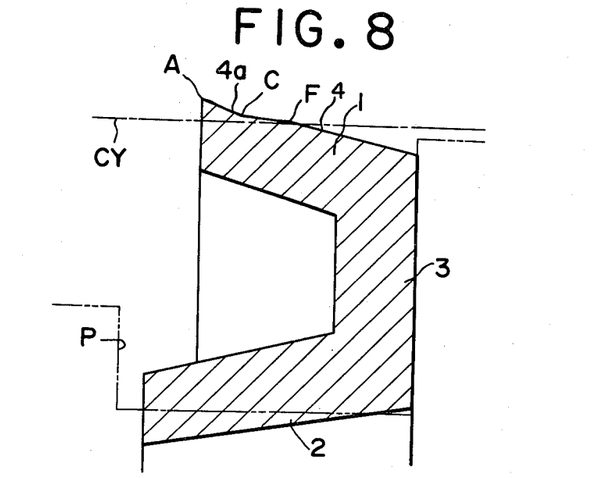
FIG. 8 is a diagrammatical illustration similar to FIG. 6 but showing a piston cup in accordance with one embodiment of the present invention.
Figure 9:
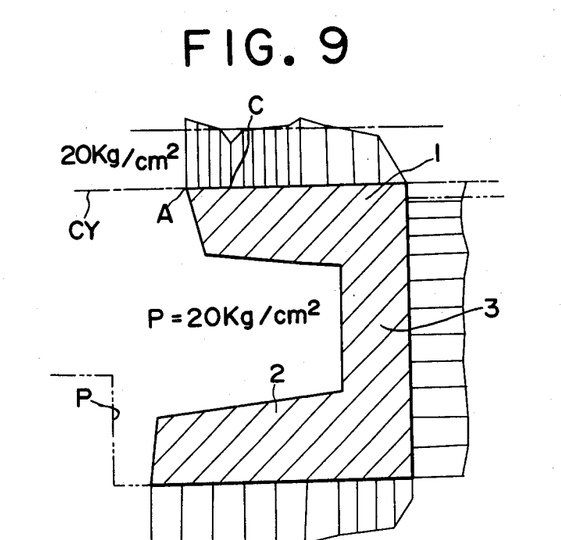
FIG. 9 is a diagrammatical illustration similar to FIG. 7, but showing the piston cup of the embodiment of the present invention shown in FIG. 8.

FIGS. 8 and 9 show an embodiment of the present invention and respectively correspond to FIGS. 6 and 7. As described with reference to FIG. 3, the sealing cup is formed at the sealing surface 4 on the outer sealing lip 1 with a V-shaped recess 4a which may for example be 0.1 mm deep. As shown in FIG. 9, the pressure of contact of the outer sealing lip 1 with the cylinder CY is decreased at the area of the V-shaped recess, so that it becomes possible to maintain an oil film in this area. By providing the V-shaped recess, the pressure of contact between the outer sealing lip 1 and the cylinder bore wall is increased to some extent, resulting in the increase in sealing effect. However, it has been confirmed that such an increase in the contact pressure does not cause any increase in the drag force.

Figure 4:
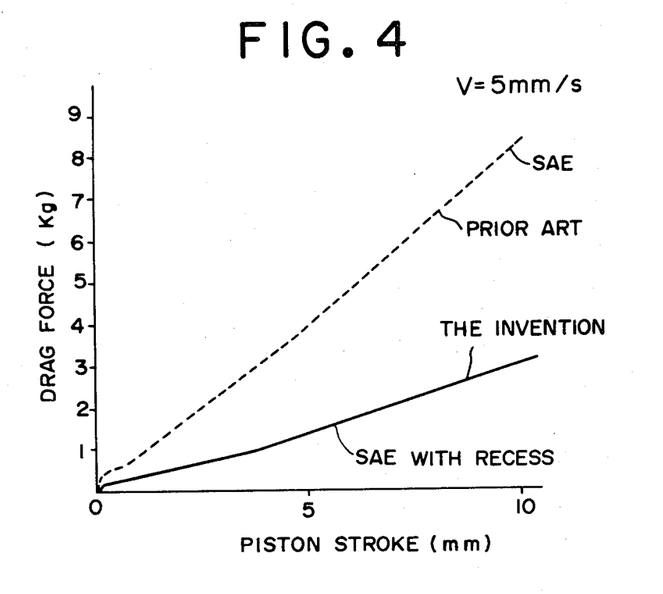
FIG. 4 is a diagram showing the relationship between the sliding drag force and the piston stroke.
Figure 5:
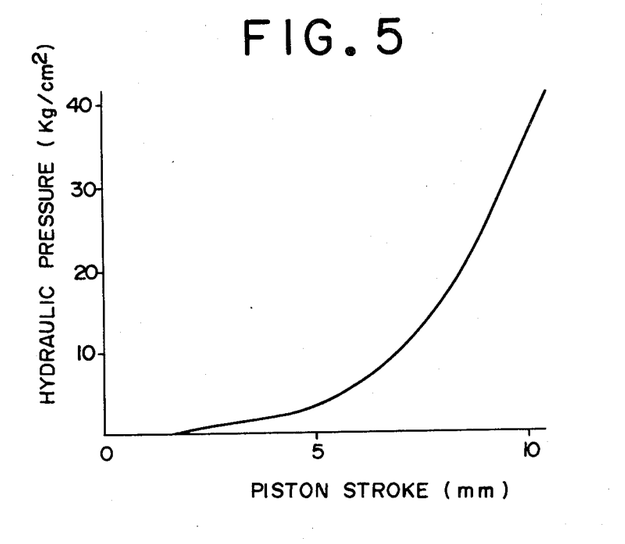
FIG. 5 is a diagram showing a change in hydraulic pressure in response to a piston stroke.

FIGS. 4 and 5 show test results on the sealing cups as shown in FIGS. 6 and 8. In FIG. 4, there are shown changes in drag forces in accordance with the piston movement and in FIG. 5 there is shown a change in hydraulic pressure in accordance with the piston movement. It will be noted in FIG. 4 that the drag force can be significantly decreased in the sealing cup embodying the features of the present invention. Since the V-shaped recess 4a is formed in a manner that one of the top edges thereof coincides with the free edge of the sealing surfaces, the aforementioned results can be obtained without having any adverse effect on the sealing property.

Figure 10:
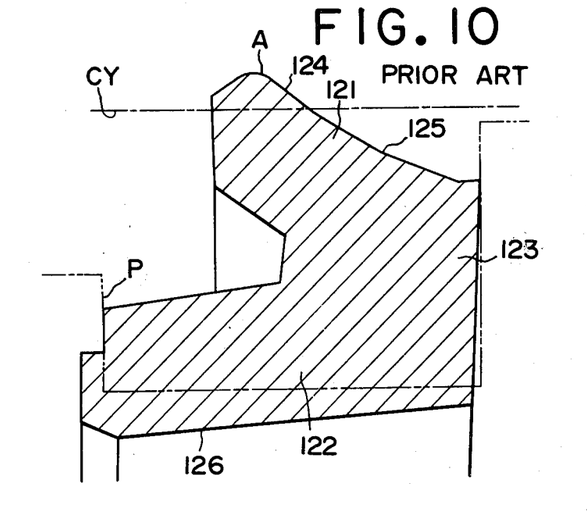
FIG. 10 is a view similar to FIG. 6 but showing a typical example of so-called OPEL type piston cup.
Figure 11:
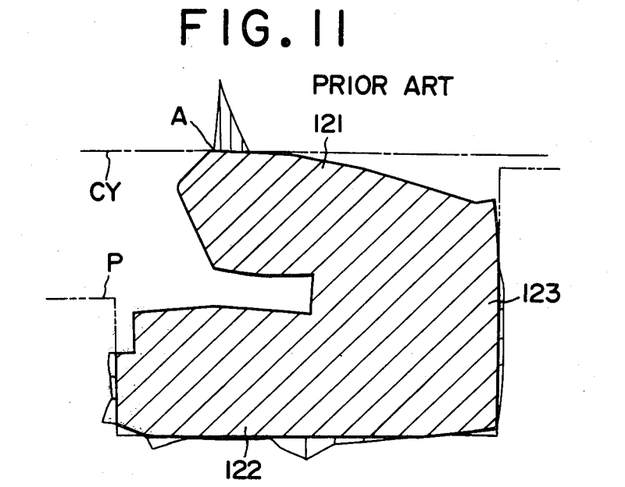
FIG. 11 is a view similar to FIG. 7 but showing the piston cup as shown in FIG. 10.

Referring now to FIGS. 10 and 11, there is shown a conventional OPEL type sealing cup which may suitably be used as a secondary cup. As in FIGS. 6 through 9, the broken line CY designates the contour of the cylinder bore and the broken line P the contour of the piston on which the sealing cup is mounted. As shown in FIG. 10, the sealing cup has a cross-section including a base 123, an outer sealing lip 121 extending from the base 123, and an inner sealing lip 122 extending also from the base 123. The outer sealing lip 121 has outer surfaces 124, 125 which are adapted to be brought into slidable contact with the cylinder wall. The inner sealing lip 122 has an inner surface 126 which engages the piston P.

The inner surface 126 of the inner sealing lip 122 has a diameter smaller than that of the piston portion where the sealing cup is mounted. The outer surface 124 of the outer sealing lip 121 has a maximum diameter which is larger than the diameter of the cylinder bore. It will therefore be noted that the outer and inner sealing lips 121 and 122 are deformed as shown in FIG. 11 when the sealing cup is assembled in the piston-cylinder device. Due to the deformation, the sealing lips 121 and 122 respectively engage the cylinder CY and the piston P.

In this type of sealing cup, the sealing lips 121 and 122 and the base 123 have greater thickness as compared with the sealing cup as shown in FIGS. 6 through 9 so that a larger contact pressure is produced upon installation of the sealing cup. Therefore, even when the maximum diameter of the outer sealing lip 121 is substantially the same as the cylinder bore diameter, a sealing pressure will be produced between the cylinder and the outer sealing lip since the sealing cup will be radially expanded when it is mounted on the piston.

Figure 12:
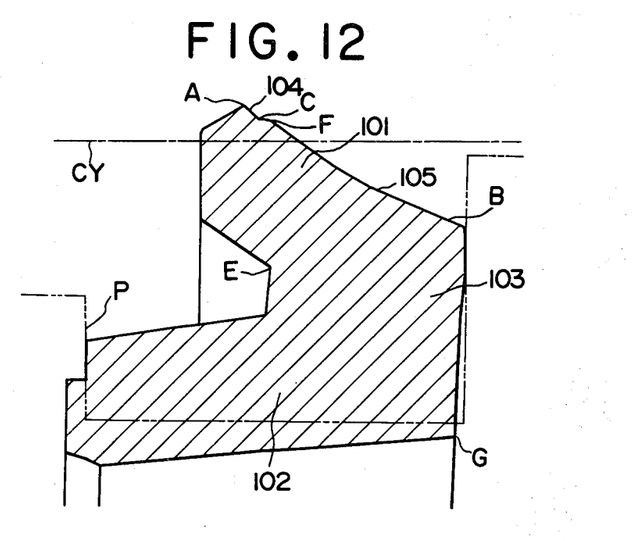
FIG. 12 is a view similar to FIG. 10 but showing an example in which the present invention is applied to a sealing cup as shown in FIG. 10.
Figure 13:
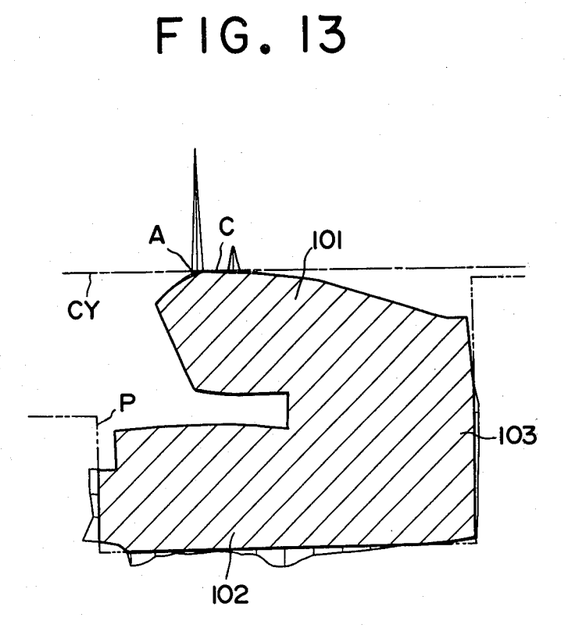
FIG. 13 is a view similar to FIG. 11 but showing the piston cup as shown in FIG. 12.

Referring now to FIGS. 12 and 13, there is shown an embodiment in which the feature of the present invention is incorporated in a seal of the type as shown in FIGS. 10 and 11. In this embodiment, the outer sealing lip 101 is formed at the outer surface 105 with a V-shaped groove 104 which is located in the vicinity of the free edge thereof. The groove 104 may be for example 0.1 mm deep as in the previously discussed embodiment. As shown in FIG. 13, the contact pressure between the outer sealing lip 101 and the cylinder CY is decreased to substantially zero at the area of the V-shaped groove 104 so that it becomes possible to maintain a slight amount of oil in this area for facilitating lubrication. It should further be noted in FIG. 13 that there is an increase in the peak contact pressure at the edge portion of the outer sealing lip 101 so that there will be no decrease in the sealing effect due to the provision of the V-shaped groove 104.

Figure 14:
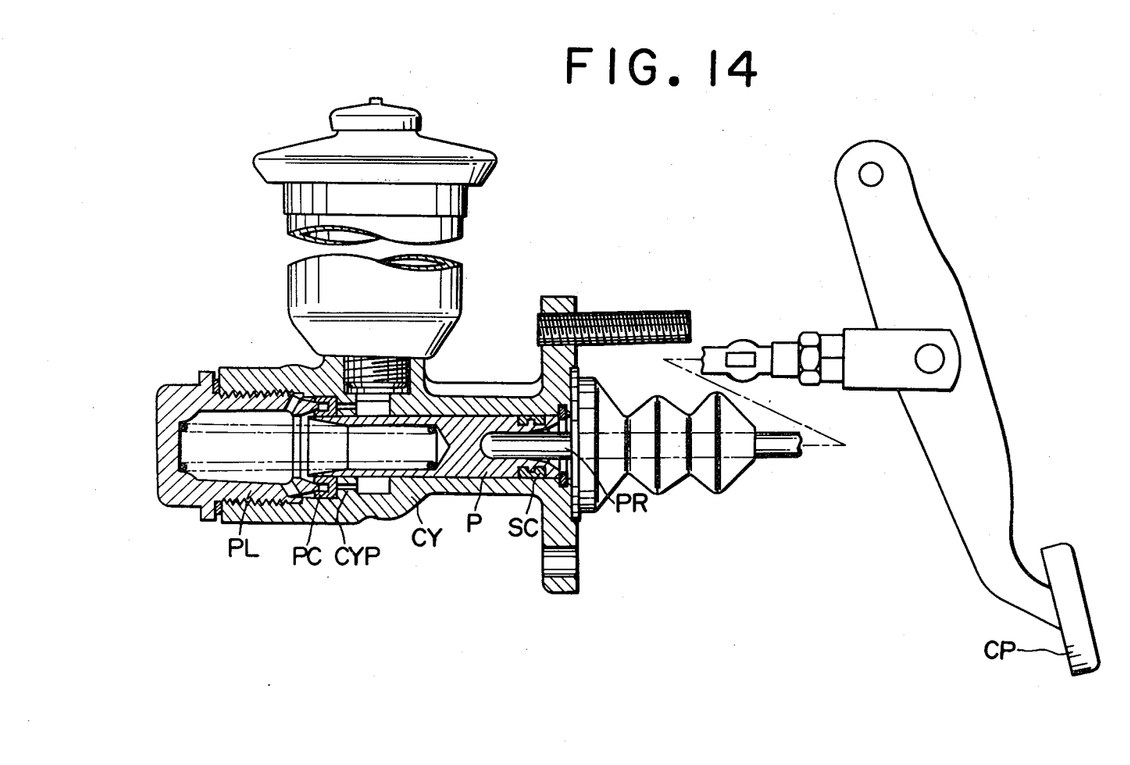
FIG. 14 is a sectional view of a clutch actuating piston-cylinder device in which piston cups of the present invention may be incorporated.

Referring now to FIG. 14, there is shown in sectional view an example of a clutch master cylinder device in which sealing cups in accordance with the present invention can be incorporated. The clutch master cylinder device is composed of cylinder CY having a cylinder bore and a piston P received in the cylinder bore for axial movement. The piston P is connected with a push rod PR which is in turn connected with a clutch actuating pdal CP so that the piston P can be axially moved upon actuation of the clutch pedal CP. The cylinder CY has an end cap PL which closes the cylinder bore at the end opposite to the push rod PR.

In the cylinder bore, there is formed an annular shoulder CYP and a primary sealing cup PC is mounted on the cylinder CY at the shoulder CYP. The piston P carries a secondary sealing cup SC.

Figure 15:
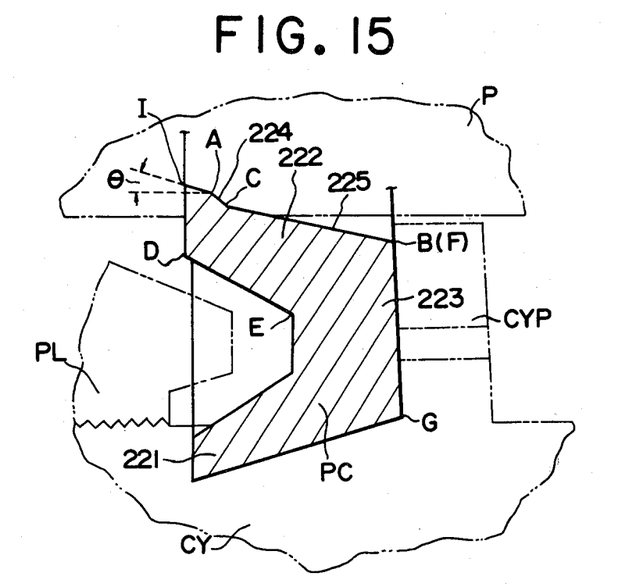
FIG. 15 is a fragmentary sectional view showing a piston cup designed for use in the piston-cylinder device shown in FIG. 14 and embodying the feature of the present invention.

Referring to FIG. 15 showing the primary sealing or piston cup PC in an enlarged scale, the sealing cup PC comprises an annular body having a cross-section including a base 223, an outer sealing lip 221 adapted to engage the cylinder CY and an inner sealing lip 222 adapted to engage the piston P. The sealing cup PC is mounted on the cylinder CY with the base 223 in engagement with the shoulder CYP and maintained in position against detachment by the cap PL. The inner lip 222 is therefore slidable with respect to the piston P.

As shown in FIG. 15, the outer sealing lip 221 has an outer diameter larger than the cylinder bore diameter so that the lip 221 is radially inwardly deformed or bent upon installation on the cylinder CY. The inner sealing lip 222 has an inner sealing surface 225 adapted to be brought into engagement with the piston P. The inner sealing surface 225 on the inner sealing lip 222 has a free edge I and a radially inwardly inclined smooth area is provided from the edge I to a point A where the surface 225 is recessed to a bottom point C so as to form a substantially V-shaped recess 224 of for example 0.2 mm deep.

The surface defined between the edge I and the point A is inclined with respect to the axis of the cylinder CY radially outwardly from the edge I by an angle $\theta$. This surface provides a wedge shaped gap with piston P where the sealing cup PC is installed in the device. In this arrangement, oil is allowed to enter the gap upon sliding movement of the piston P so as to form a lubricating film of oil on the sliding surface. According to the present invention, the angle $\theta$ must be between $1° \leq \theta \leq 10°$ as measured in FIG. 15.

Further, the V-shaped groove 224 formed in the inner surface of the inner sealing lip 222 functions to provide an area wherein the pressure of contact is low so that it is possible to maintain oil in this area for facilitating lubrication. It is therefore possible to maintain a smooth operation of the piston P.

Figure 16:
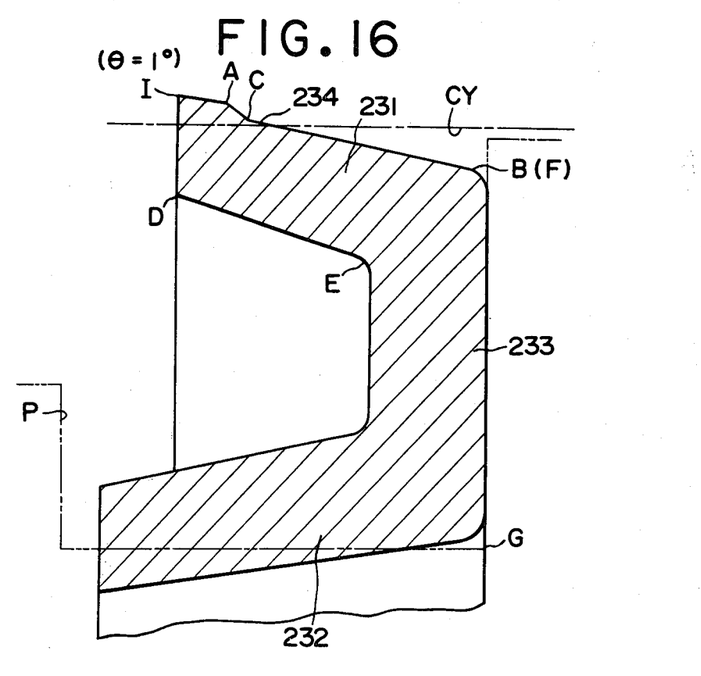
FIG. 16 is an enlarged view of a section of the piston cup in FIG. 15 specifically showing dimensional relationship between the piston cup and the piston and cylinder.
Figure 17:
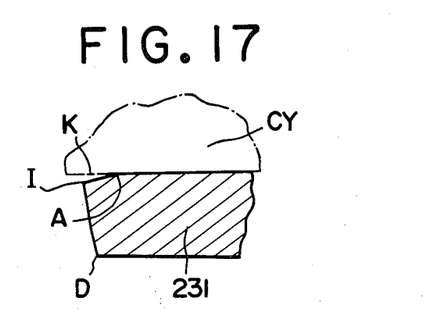
FIG. 17 is a fragmentary sectional view of the sealing lip in the piston cup as shown in FIG. 16 specifically showing how a wedge shaped gap is formed.

Referring now to FIG. 16, there is shown a primary sealing cup which includes a base 233, an outer sealing lip 231 and an inner sealing lip 232. The inner sealing lip 232 is adapted to engage the piston P and the outer sealing lip 231 is adapted to engage the cylinder CY. The outer sealing lip 231 includes an outer surface having a free edge I and a smooth cylindrical surface is provided from the edge I to a point A where the outer surface is recessed to a point C to form a substantially V-shaped recess 234 of for example 0.15 mm deep. In this arrangement, when the sealing cup is assembled in the piston-cylinder device, a wedge-shaped gap K is formed at the cylindrical surface between the edge I and the point A as shown in FIG. 17. Thus, oil is allowed to enter the gap K to form a film of lubricant oil on the sliding surface. The surface between the edge I and the point A may be inclined with respect to the axis of the cylinder by an angle between $1° \leq \theta \leq 15°$ as measured in clockwise direction in FIG. 16. More preferably, the angle should be between $1° \leq \theta \leq 7°$. The V-shaped recess 234 functions to facilitate lubrication as in the previous embodiments.

Figure 18A:
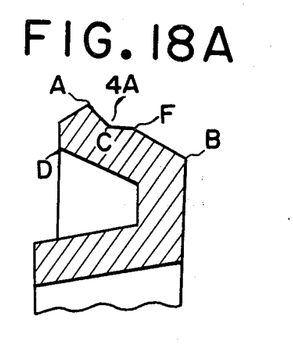
Figure 18B:
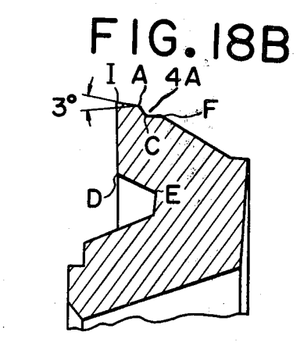

Referring further to FIG. 18 (A), there is shown an example in which the present invention is embodied in a so-called OPEL type sealing cup. In this example, a V-shaped recess 4A is formed on the outer sealing surface with one of the top edges of the V-shape coincident with the free edge A of the sealing surface. In FIG. 18 (B), the surface IA is inclined by an angle of 3° as measured in clockwise direction in the plans of the drawing. This design is also effective to provide a sealing property.

Figure 19:
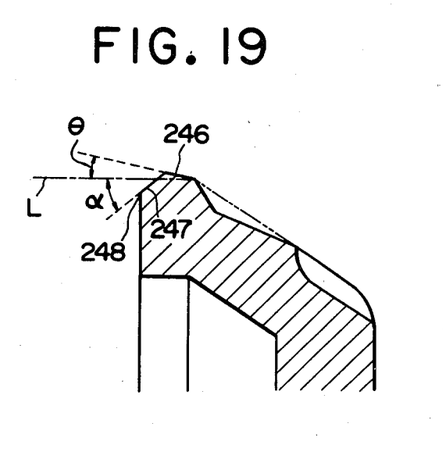
FIG. 19 is a sectional view of a further embodiment according to the present invention.

FIG. 19 shows a modified embodiment of the present invention in which a further inclined surface 247 is provided on a leading edge 246 of the sealing cup. The surface 247 is inclined with respect to a line (L) in the direction opposite to the inclination indicated by $\theta$ and such the inclination is designated by $\alpha$ in FIG. 19. It is noted that the surface 247 is inclined in a way that the tip portion 248 thereof is apart from the wall when mounted where the sealing cup is slidably contacted. The angle ($\alpha$) is selected from the range of 0° to 45° the preferable range of the angle ($\alpha$) is 15° to 45°.

The invention has been shown and described with reference to specific embodiments, however, it should be noted that the present invention is in no way limited to the details of the illustrated embodiments but changes and modifications may be made within the scope of the appended claims. For example, the annular groove on the sealing surface may be of any configuration insofar as such groove is formed with a plurality of lines, and may be of any depth, preferably between 0.05 and 0.5 mm. Further, a plurality of such annular grooves may be provided. Furthermore, the sealing or piston cup of the present invention may be incorporated in any type of piston-cylinder device other than the brake or clutch master cylinder device as described. For example, it may be incorporated in a proportioning valve which functions to determine the rear wheel brake pressure at a valve smaller than but proportioned to the front wheel brake pressure.

What we claim is:

1. A sealing cup for sealing space between cooperating piston and cylinder walls of a hydraulic piston-cylinder device, said sealing cup comprising:

an annular body of resilient material including an annular base having an axis adapted to be substantially coincident with the axis of said cylinder when installed;

an annular inner sealing lip extending in a first axial direction from said annular base and having an edge remote from said annular base and an inner sealing surface adapted to be engaged with a wall to be sealed; and an annular outer sealing lip extending in said first axial direction from said annular base so as to encircle said inner sealing lip in spaced relationship therewith and having an edge remote from said annular base and an outer sealing surface adapted to be engaged with a wall surface to be sealed;

at least one of said inner and outer sealing surfaces adapted to be slidably movable with respect to one of said piston and cylinder walls to be sealed, said slidably movable sealing surface consisting of first, second and third annular surfaces having substantially straight line axial profiles, said first annular surface extending from said annular base in said first axial direction and extending at an acute angle to said axis radially outwardly when said corresponding wall is said cylinder wall and radially inwardly when said corresponding wall is said piston wall, said second annular surface connected to and extending from said first annular surface in said first axial direction and extending at an angle to said axis less than said acute angle radially inwardly when said corresponding wall is said cylinder wall and radially outwardly when said corresponding wall is said piston wall, and said third annular surface connected to and extending from said second annular surface in said first axial direction at an angle to said axis greater than said acute angle and extending radially outwardly when said corresponding wall is said cylinder wall and radially inwardly when said corresponding wall is said piston wall, said second and third annular surfaces intersecting at an obtuse angle and defining an annulr groove in said slidably movable sealing surface, the edge of said slidably movable sealing surface and the intersection of said first and second annular surfaces being adapted to exert greater sealing pressure than the vertex of said annular groove when said slidably movable sealing surface is mounted for sealing engagement with said corresponding wall for retaining lubricating oil in said annular groove during axial movement of said slidably movable sealing surface.

2. The sealing cup as in claim 1 wherein the maximum depth $D_{max}$ of said annular groove satisfies the relationship $$0.05 \text{mm} \leq D_{max} \leq 0.5 \text{ mm}.$$

3. The sealing cup as in claim 2 also including at the edge of said slidably movable sealing surface a circumferentially extending, annular inclined portion, said annular inclined portion when said sealing cup is unmounted extending from said edge in said first axial direction and extending radially outwardly from said axis when the cylinder wall is said corresponding wall and radially inwardly towards said axis when the piston wall is said corresponding wall, wherein the angle $\theta$ of said annular inclined portion to said axis when said sealing cup is unmounted satisfies the relationship $$1° \leq \theta \leq 15°,$$

and wherein said annular inclined portion forms a wedge-shaped clearance between said annular inclined portion and said corresponding wall when said sealing cup is mounted, the wedge-shaped clearance opening a said first axial direction.

4. The sealing cup as in claim 3 also including a circumferentially extending, annular chamfered portion, said annular chamfered portion extending from said annular inclined portion in said first axial direction at an angle $\alpha$ to said axis when said sealing cup is unmounted, said angle $\alpha$ being negative with respect to and having an absolute value greater than the angle $\theta$ of said inclined portion and satisfying the relationship $$-15° \leq \alpha \leq -45°,$$

said chamfered portion when said sealing cup is mounted retaining lubricating oil within a triangular-shaped clearance formed between said chamfered portion and said corresponding wall and guiding said lubricating oil to said wedge-shaped clearance.

5. The sealing cup as in claim 3 wherein the angle of said annular inclined portion satisfies the relationship $$1° \leq \theta \leq 7°.$$

6. The sealing cup as in claim 4 wherein said angle of said annular chamfered portion satisfies the relationship $$\alpha = -30°.$$

7. The sealing cup as in claim 1 wherein said corresponding wall is said cylinder wall.

8. The sealing cup as in claim 1 wherein said corresponding wall is said piston wall.

* * * * *

UNITED STATES PATENT AND TRADEMARK OFFICE
CERTIFICATE OF CORRECTION

PATENT NO. : 4,345,771
DATED : August 24, 1982
INVENTOR(S) : Junzo Hasegawa et al.

It is certified that error appears in the above—identified patent and that said Letters Patent is hereby corrected as shown below:

Claim 3, Column 10, Line 1, change "a" to --in--.

Signed and Sealed this

Twenty-second Day of March 1983

[SEAL]

*Attest:*

GERALD J. MOSSINGHOFF

*Attesting Officer*     *Commissioner of Patents and Trademarks*